W. S. RIGGS.
Land-Marker.
No. 44,659. Patented Oct. 11, 1864.
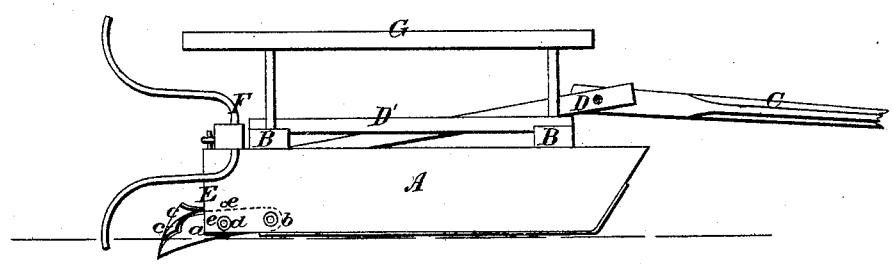
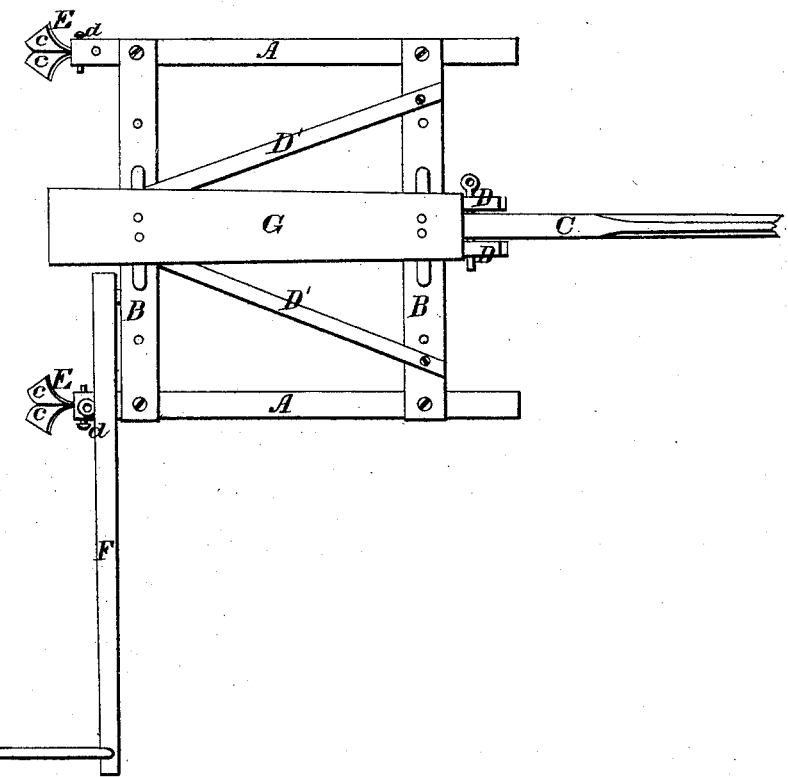
Witnesses:
Wm. F. McNamara
J. P. Hall.
Inventor:
W. S. Riggs
per Munn & Co.
attorneys

UNITED STATES PATENT OFFICE.

W. S. RIGGS, OF HIGHTSTOWN, NEW JERSEY.

FURROWING DEVICE.

Specification forming part of Letters Patent No. 44,659, dated October 11, 1864.

*To all whom it may concern:*

Be it known that I, W. S. RIGGS, of Hightstown, in the county of Mercer and State of New Jersey, have invented a new and Improved Furrowing Device; and I do hereby declare that the following is a full, clear, and exact description thereof, which will enable others skilled in the art to make and use the same, reference being had to the accompanying drawings, making a part of this specification, in which—

Figure 1 is a side view of my invention; Fig. 2, a plan or top view of the same.

Similar letters of reference indicate like parts.

This invention relates to a new and improved device for furrowing land for planting corn and other seed which are planted in hills or drills.

The invention consists in the employment or use of two shares constructed in such a manner as to form furrows without dragging or raking up weeds, trash, &c., said shares being attached to two runners in such a manner that they may be capable of being adjusted higher or lower, according to the depth of the furrow required.

A A represent two runners, constructed similar to sled-runners and connected by cross-bars B B.

C is a draft-pole fitted between longitudinal bars D D, which are secured to the cross-bars B, and D' D' are oblique braces attached to said cross-bars.

In the rear end of each runner A there is fitted a share, E. These shares are composed of a flat tang or shank, $a$, which are fitted in slots in the rear of the runners, and secured therein by pins $b$, which pass loosely through the shanks $a$. The back parts of these shanks $a$ spread outward at each side, as shown in both figures, forming what may be termed "two mold-boards," $c$ $c$, which are curved outward and unite at their inner parts, so as to form a straight lower edge, which coincides or is in line with the lower edge of the shanks $a$, as shown in Fig. 1. The shares may be formed of a single piece of sheet metal doubled to form the shank $a$, and then bend at their ends to form the mold-boards $c$. The shares E may be adjusted higher or lower by means of a pin, $d$, which passes through any of a series of holes, $e$, in the runners A A and the shanks $a$. By having the shares E constructed in this manner they form good open furrows, and cannot rake up weeds, trash, &c., which may be in their path, as is the case with the ordinary straight or inclined shovel-shares, and which occasions a great deal of trouble and delay, as the shares have frequently to be cleaned from the weeds and trash, in order that they may perform their work.

I design to have a marker, F, attached to the implement, the same as now used in such and similar implements, to insure the furrows being made at the requisite distance apart.

A seat, G, for the driver is also placed on the implement.

I claim as new and desire to secure by Letters Patent—

The adjustable shares E, when constructed with mold-boards $c$ $c$, curved outward at the upper and rear ends of the shanks $a$, which are secured in the rear ends of the runners A A by pins $b$ to form a new and improved furrowing device, for the purpose specified.

WM. S. RIGGS.

Witnesses:
C. M. NORTON,
ISAAC H. GOLDY.